US011046827B2

(12) United States Patent
Byun et al.

(10) Patent No.: US 11,046,827 B2
(45) Date of Patent: Jun. 29, 2021

(54) ANTI-REFLECTIVE FILM AND PREPARATION METHOD OF THE SAME

(71) Applicant: LG CHEM, LTD., Seoul (KR)

(72) Inventors: Jin Seok Byun, Daejeon (KR); Yeong Rae Chang, Daejeon (KR); Hee Jung Choi, Daejeon (KR); Jae Young Kim, Daejeon (KR)

(73) Assignee: LG CHEM., LTD., Seoul (KR)

( * ) Notice: Subject to any disclaimer, the term of this patent is extended or adjusted under 35 U.S.C. 154(b) by 164 days.

(21) Appl. No.: 15/750,352

(22) PCT Filed: Mar. 10, 2017

(86) PCT No.: PCT/KR2017/002639
§ 371 (c)(1),
(2) Date: Feb. 5, 2018

(87) PCT Pub. No.: WO2017/155358
PCT Pub. Date: Sep. 14, 2017

(65) Prior Publication Data
US 2018/0231690 A1 Aug. 16, 2018

(30) Foreign Application Priority Data

Mar. 11, 2016 (KR) .................. 10-2016-0029338
Mar. 9, 2017 (KR) .................. 10-2017-0030172

(51) Int. Cl.
| | | |
|---|---|---|
| *G02B 1/111* | (2015.01) | |
| *C08L 33/10* | (2006.01) | |
| *C08J 5/18* | (2006.01) | |
| *C08J 7/04* | (2020.01) | |
| *C08K 3/34* | (2006.01) | |
| *C08J 7/046* | (2020.01) | |
| *C08F 2/44* | (2006.01) | |
| *C08F 220/24* | (2006.01) | |
| *C08J 7/18* | (2006.01) | |
| *C08F 222/18* | (2006.01) | |
| *C08K 7/24* | (2006.01) | |
| *C08F 2/48* | (2006.01) | |
| *C09D 135/02* | (2006.01) | |
| *C08K 9/06* | (2006.01) | |

(52) U.S. Cl.
CPC .............. *C08J 7/046* (2020.01); *C08F 2/44* (2013.01); *C08F 220/24* (2013.01); *C08F 222/18* (2013.01); *C08J 5/18* (2013.01); *C08J 7/0427* (2020.01); *C08J 7/18* (2013.01); *C08K 3/34* (2013.01); *C08L 33/10* (2013.01); *G02B 1/111* (2013.01); *C08F 2/48* (2013.01); *C08F 222/185* (2020.02); *C08J 2301/12* (2013.01); *C08J 2435/02* (2013.01); *C08K 7/24* (2013.01); *C08K 9/06* (2013.01); *C08K 2201/006* (2013.01); *C08K 2201/011* (2013.01); *C08L 2201/04* (2013.01); *C09D 135/02* (2013.01)

(58) Field of Classification Search
CPC ....... C08J 5/18; C08J 7/04; C08J 7/047; C08J 7/18; C08J 2301/12; C08J 2435/02; C08K 3/34; C08K 7/24; C08K 9/06; C08K 2201/006; C08K 2201/011; C08L 33/10; C08L 2201/04; C08F 2/44; C08F 220/24; C08F 222/18; C08F 2/48; G02B 1/111; C09D 135/02
See application file for complete search history.

(56) References Cited

U.S. PATENT DOCUMENTS

| | | | |
|---|---|---|---|
| 2003/0143345 A1* | 7/2003 | Satou | .......... B41M 5/5218 428/32.1 |
| 2006/0210727 A1* | 9/2006 | Ibuki | ............ G02B 1/111 428/1.31 |
| 2008/0032053 A1 | 2/2008 | Kourtakis et al. | |
| 2009/0202819 A1 | 8/2009 | Asahi et al. | |
| 2010/0027123 A1 | 2/2010 | Imai et al. | |
| 2010/0265580 A1 | 10/2010 | Yun et al. | |
| 2012/0256336 A1 | 10/2012 | Yano et al. | |
| 2013/0196140 A1 | 8/2013 | Lewis et al. | |
| 2013/0216807 A1* | 8/2013 | Wakefield | ........ G02B 1/111 428/218 |

FOREIGN PATENT DOCUMENTS

| | | |
|---|---|---|
| CN | 102656119 A | 9/2012 |
| JP | 2005099778 A | 4/2005 |
| JP | 2005-292646 A | 10/2005 |
| JP | 2006-017870 A | 1/2006 |
| JP | 3862413 B2 | 12/2006 |
| JP | 2009069317 A | 4/2009 |
| JP | 2009-217258 A | 9/2009 |

(Continued)

OTHER PUBLICATIONS

Yoshiyuki et al, "KR20120044286A—English Translation," Published 2012, European Patent Office, pp. 1-26 (Year: 2012).*
Okubo et al, "Meso. Silica Nanoparticles with Remarkable Stab, and Disp. for Antireflective Coatings," Dec. 1, 2009, Chem. Mater. (ACS), Issue 22, pp. 12-14 (Year: 2009).*

*Primary Examiner* — Maria V Ewald
*Assistant Examiner* — Ethan Weydemeyer
(74) *Attorney, Agent, or Firm* — Dentons US LLP

(57) ABSTRACT

The present invention relates to an anti-reflective film including: a hard coating layer; and a low refractive layer that is formed on one side of the hard coating layer, and includes porous inorganic nanoparticles with a diameter of 5 nm to 70 nm including micropores with a diameter of 0.5 nm to 10 nm, and a binder resin, and a method for preparing an anti-reflective film.

17 Claims, No Drawings

(56) References Cited

FOREIGN PATENT DOCUMENTS

| | | | |
|---|---|---|---|
| JP | 2010038949 A | | 2/2010 |
| JP | 2010196014 A | | 9/2010 |
| JP | 4632403 B2 | | 2/2011 |
| JP | 2013-001840 A | | 1/2013 |
| JP | 2013-231955 A | | 11/2013 |
| JP | 5629973 B2 | | 11/2014 |
| JP | 2015075691 A | | 4/2015 |
| JP | 5733564 B2 | | 6/2015 |
| KR | 20090046873 A | | 5/2009 |
| KR | 101009821 B1 | | 1/2011 |
| KR | 20120044286 A | | 5/2012 |
| KR | 20120044286 A | * | 5/2012 ............... G02B 1/18 |
| KR | 10-2012-0093212 A | | 8/2012 |
| KR | 101275408 B1 | | 6/2013 |
| KR | 101445437 B1 | | 9/2014 |
| KR | 20160019367 A | | 2/2016 |
| TW | 201120566 A1 | | 6/2011 |
| TW | 201128215 A1 | | 8/2011 |

\* cited by examiner

ANTI-REFLECTIVE FILM AND PREPARATION METHOD OF THE SAME

CROSS-REFERENCE TO RELATED APPLICATION(S)

This application is a National Stage Entry of International Application No. PCT/KR2017/002639, filed on Mar. 10, 2017, and claims the benefit of and priority to Korean Application No. 10-2016-0029338, filed on Mar. 11, 2016, and Korean Application No. 10-2017-0030172, filed on Mar. 9, 2017, all of which are hereby incorporated by reference in their entirety for all purposes as if fully set forth herein.

TECHNICAL FIELD

The present invention relates to an anti-reflective film and a method for preparing the same, and more specifically, to an anti-reflective film that has low reflectance and high light transmittance, that can simultaneously realize high scratch resistance and anti-pollution properties, and that can increase screen sharpness of a display device, and a method for preparing the anti-reflective film.

BACKGROUND OF ART

In general, in flat panel display devices such as a PDP, an LCD, etc., an anti-reflective film is installed so as to minimize reflection of incident light from the outside.

Methods for minimizing the reflection of light include a method of dispersing a filler such as fine inorganic particles, etc. in a resin, coating it on a substrate film, and forming unevenness (anti-glare: AG coating), a method of using light interference by forming multiple layers having different refractive indexes on a substrate film (anti-reflective; AR coating), a method of using them together, etc.

Among them, in the case of AG coating, although the absolute amount of reflected light is equivalent to that of common hard coatings, a low reflection effect can be obtained by reducing the amount of light entering the eyes using light scattering through unevenness. However, since the AG coating has lowered screen sharpness due to the surface unevenness, recently, many studies are being conducted on AR coating.

As films using the AR coating, those having a multi-layered structure in which a hard coating layer (high refractive index layer), a low reflective coating layer, etc. are stacked on a substrate film are being commercialized. However, since the method of forming multiple layers conducts individual processes for forming each layer, it has a disadvantage in terms of lowered scratch resistance due to weak interlayer adhesion (interface adhesion).

Further, previously, in order to improve scratch resistance of the low refractive layer included in the anti-reflective film, a method of adding various particles of a nanometer size (for example, silica, alumina, zeolite, etc.) was mainly attempted. However, when nanometer-sized particles are used, it is difficult to simultaneously increase scratch resistance while lowering the reflectance of the low refractive layer, and due to the nanometer-sized particles, the anti-fouling property of the surface of the low refractive layer is significantly deteriorated.

Accordingly, in order to reduce the absolute reflection amount of incident light from the outside and improve the anti-fouling property as well as scratch resistance of the surface, many studies are being conducted, but the resulting property improvement degree is unsatisfactory.

DETAILED DESCRIPTION OF THE INVENTION

Technical Problem

It is an object of the present invention to provide an anti-reflective film that has low reflectance and high light transmittance, that can simultaneously realize high scratch resistance and anti-pollution properties, and that can increase screen sharpness of a display device.

It is another object of the present invention to provide a method for preparing an anti-reflective film having the above-explained properties.

Technical Solution

An anti-reflective film including: a hard coating layer; and a low refractive layer that is formed on one side of the hard coating layer, and includes porous inorganic nanoparticles with a diameter of 5 nm to 70 nm including micropores with a diameter of 0.5 nm to 10 nm, and a binder resin, is provided herein.

Further, a method for preparing an anti-reflective film is provided herein, including the steps of: applying a resin composition for forming a low refractive layer including a photopolymerizable compound or a (co)polymer thereof, a fluorine-containing compound including a photoreactive functional group, a photoinitiator, and porous inorganic nanoparticles with a diameter of 5 nm to 70 nm including micropores with a diameter of 0.5 nm to 10 nm, on a hard coating layer, and drying it; and photocuring the dried product of the resin composition.

Hereinafter, an anti-reflective film and a method for preparing an anti-reflective film according to specific embodiments of the present invention will be explained in detail.

In the present specification, a photopolymerizable compound commonly designates a compound that causes a polymerization reaction if light, for example visible rays or ultraviolet rays, is irradiated thereto.

Further, a fluorine-containing compound means a compound including at least one fluorine atom therein the compound.

In addition, "(meth)acryl" includes both acryl and methacryl.

The term "(co)polymer" includes both copolymer and homopolymer.

Additionally, silica hollow particles are silica particles derived from a silicon compound or an organosilicon compound, wherein an empty space exists on the surface and/or inside of the silica particles.

According to one embodiment of the present invention, an anti-reflective film is provided, including: a hard coating layer; and a low refractive layer that is formed on one side of the hard coating layer, and includes porous inorganic nanoparticles with a diameter of 5 nm to 70 nm including micropores with a diameter of 0.5 nm to 10 nm, and a binder resin.

Previously, in order to lower the reflectance of an antireflective film, a method of using an excessive amount of hollow silica with low refractive index was known, but when hollow silica is excessively used, scratch resistance and anti-pollution properties were significantly deteriorated.

Thus, the present inventors conducted studies on an antireflective film, confirmed through experiments that if porous inorganic nanoparticles including micropores with a diameter of 0.5 nm to 10 nm are distributed in a low refractive layer included in an antireflective film, low reflectance of a level that could not be realized in the previously known antireflective films can be realized, and the antireflective film has high light transmittance and can simultaneously realize high scratch resistance and anti-pollution properties, and completed the present invention.

As explained above, the porous inorganic nanoparticles may include micropores with a diameter of 0.5 nm to 10 nm, 1 nm to 8 nm, or 2 nm to 6 nm.

Since the porous inorganic nanoparticles include micropores with the above-described diameter, the antireflective film may secure a lower refractive index and more improved mechanical properties of the surface, compared to the case of using commonly known inorganic particles. Thus, when the porous inorganic nanoparticles are used, compared to the antireflective films using low refractive layers including previously known solid inorganic nanoparticles or hollow inorganic nanoparticles, remarkably lowered reflectance, for example reflectance of 0.40% or less can be realized, significantly improved surface strength can be realized, and higher scratch resistance and anti-pollution properties can be simultaneously realized.

More specifically, the anti-reflective film may exhibit mean reflectance of 0.40% or less, 0.10% to 0.40%, 0.15% to 0.35%, 0.20% to 0.30%, or 0.21% to 0.29%, in the visible light wavelength region of 380 nm to 780 nm.

The size of the micropores formed in the porous inorganic nanoparticles can be confirmed by an apparatus such as a TEM or a SEM, a BET analysis method, etc. For example, the size of the micropores may be quantitatively measured and defined, wherein the BET surface area of a sample is measured through BET (Brunauer, Emmett, Teller) analysis of the amount of nitrogen gas adsorbed on the surface of a sample, and based on a Barrett-Joyner-Halenda (BJH) analysis, the size of the micropores can be measured and defined. The diameter of the micropores means the longest diameter of the micropores confirmed in the cross-section of the porous inorganic nanoparticles.

The shape of the micropores formed in the porous inorganic nanoparticles is also not significantly limited, and the cross-section of the micropores formed in the porous inorganic nanoparticles may have a circular, elliptical, or polygonal shape, etc.

The porous inorganic nanoparticle may include micropores with a diameter of 0.5 nm to 10 nm, or 1 nm to 8 nm, and may also include pores with a diameter of less than 0.5 nm and/or micropores with a diameter greater than 10 nm. In this case, the porous inorganic nanoparticles may include the micropores with a diameter of 0.5 nm to 10 nm or 1 nm to 8 nm in the amount of 75 vol % or more or 90 vol % or more.

The porous inorganic nanoparticles may include pores with a diameter of 0.5 nm to 10 nm, or 1 nm to 8 nm, and may have a BET surface area of 250 to 2000 $m^2/g$.

The porous inorganic nanoparticles may have a diameter of 5 nm to 100 nm, 5 nm to 70 nm, or 10 nm to 60 nm. The diameter of the porous inorganic nanoparticles may mean the longest diameter confirmed in the cross-section of the porous inorganic nanoparticles.

If the diameter of the porous inorganic nanoparticles is too large, the mean reflectance or haze of the prepared low refractive layer or anti-reflective film may significantly increase, or dynamic scattering of the anti-reflective film may be generated.

If the diameter of the porous inorganic nanoparticles is too small, micropores may not be sufficiently formed in the porous inorganic nanoparticles, resulting in a relatively high refractive index, and thus the refractive index of the low refractive layer may increase and the mean reflectance of the anti-reflective film may excessively increase. In addition, if the diameter of the porous inorganic nanoparticles is too small, the porous inorganic particles may not be uniformly distributed in the low refractive layer, and thus the mechanical properties of the low refractive layer or anti-reflective film including the same may be deteriorated.

Meanwhile, a photoreactive functional group may be introduced or a compound including a photoreactive functional group may be bonded on the surface of the porous inorganic nanoparticles. The photoreactive functional group may include various functional groups known to be capable of participating in a polymerization reaction by the irradiation of light, and specific examples thereof may include a (meth)acrylate group, an epoxide group, a vinyl group, or a thiol group.

More specifically, silane compounds including the above-described photoreactive functional groups, or hydroxide compounds, etc. may be bonded on the surface of the porous inorganic nanoparticles.

Examples of the silane compounds including photoreactive functional groups may include vinylchlorosilane, vinyltrimethoxysilane, vinyltriethoxysilane, 2-(3,4-epoxycylcohexyl)ethyltrimethoxysilane, 3-glycidoxypropyl trimethoxysilane, 3-glycidoxypropyl methyldiethoxysilane, 3-glycidoxypropyl diethoxysilane, 3-glycidoxypropyl triethoxysilane, p-styryl trimethoxysilane, 3-methacryloxypropyl triethoxysilane, 3-methacryloxypropyl trimethoxysilane, 3-methacryloxypropyl methyldimethoxysilane, 3-methacryloxypropyl methyldiethoxysilane, 3-acryloxypropyl trimethoxysilane, N-2-(aminoethyl)-3-aminopropyl methyldimethoxysilane, N-2-(aminoethyl)-3-aminopropyl trimethoxysilane, N-2-(aminoethyl)-3-aminopropyl methyltriethoxysilane, 3-aminopropyl trimethoxysilane, 3-aminopropyl triethoxysilane, 3-triethoxysilyl-N-(1,3-dimethylbutylidene)propylamine, N-phenyl-3-aminopropyl trimethoxysilane, 3-chlropropyl trimethoxysilane, 3-mercaptopropyl methyldimethoxysilane, 3-mercaptopropyl trimethoxysilane, bis(triethoxysilylpropyl)tetrasulfide, 3-isocyanatopropyl triethoxysilane, etc. These compounds may be used alone or in combinations of two or more kinds.

Since photoreactive functional groups are introduced on the surface of the porous inorganic nanoparticles, in the process of forming a low refractive layer, the photoreactive functional groups may form a crosslink with the binder resin, and thus the mechanical properties of the surfaces of the finally prepared low refractive layer and the anti-reflective film may be improved.

As explained above, the low refractive layer includes porous inorganic nanoparticles including micropores with a diameter of 0.5 nm to 10 nm and a binder resin, and the content of the porous inorganic nanoparticles in the low refractive layer may be 15 wt % to 80 wt %, or 20 wt % to 65 wt %. Even if the porous inorganic nanoparticles are included in the low refractive layer in a relatively high content, the reflectance of the anti-reflective film can be significantly lowered, and higher scratch resistance and anti-pollution properties can be simultaneously realized.

Meanwhile, the low refractive layer may further include inorganic particles other than the porous inorganic nanoparticles, and considering the properties of the low refractive layer or anti-reflective film, it may further include commonly known inorganic particles.

Specifically, the low refractive layer may further include one or more kinds of inorganic nanoparticles selected from the group consisting of hollow inorganic nanoparticles and solid inorganic nanoparticles. The content of the one or more kinds of inorganic nanoparticles selected from the group consisting of hollow inorganic nanoparticles and solid inorganic nanoparticles in the low refractive layer may be 1 wt % to 60 wt %, or 5 wt % to 50 wt %.

The solid inorganic nanoparticles mean particles that have a maximum diameter of 100 nm or less, inside of which an empty space does not exist. The solid inorganic nanoparticles may have a diameter of 0.5 nm to 100 nm, or 1 nm to 30 nm.

The hollow inorganic nanoparticles mean particles that have a maximum diameter of 200 nm or less, on the surface and/or inside of which an empty space exists. The hollow inorganic nanoparticles may have a diameter of 1 nm to 200 nm, or 10 nm to 100 nm.

Each diameter of the solid inorganic nanoparticles and hollow inorganic nanoparticles may mean the longest diameter confirmed in the cross-section of each nanoparticle.

The solid inorganic nanoparticles and the hollow inorganic nanoparticles may respectively contain one or more reactive functional groups selected from the group consisting of a (meth)acrylate group, an epoxide group, a vinyl group, and a thiol group on the surface.

The above-explained low refractive layer may be prepared from a photocurable coating composition including a photopolymerizable compound, a fluorine-containing compound including a photoreactive functional group, porous inorganic nanoparticles including micropores with a diameter of 0.5 nm to 10 nm, and a photoinitiator.

Thus, the binder resin included in the low refractive layer may include a (co)polymer of photopolymerizable compounds and a crosslinked (co)polymer of fluorine-containing compounds including photoreactive functional groups.

The photopolymerizable compound included in the photocurable coating composition may form a substrate of the binder resin of the prepared low refractive layer. Specifically, the photopolymerizable compound may include monomers or oligomers including (meth)acrylate or vinyl groups. More specifically, the photopolymerizable compound may include monomers or oligomers including one or more, two or more, or three or more (meth)acrylate or vinyl groups.

Specific examples of the monomers or oligomers including (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, thrylene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or mixtures of two or more kinds thereof, or urethane modified acrylate oligomers, epoxide acrylate oligomers, etheracrylate oligomers, dendritic acrylate oligomers, or mixtures of two or more kinds thereof. Here, it is preferable that the molecular weight of the oligomer is 1000 to 10,000.

Specific examples of the monomers or oligomers including vinyl groups may include divinylbenzene, styrene, or paramethylstyrene.

Although the content of photopolymerizable compound in the photocurable coating composition is not particularly limited, considering the mechanical properties of the finally prepared low refractive layer or anti-reflective film, the content of the photopolymerizable compound may be 20 wt % to 80 wt %. The solid content of the photocurable coating composition means only solid components excluding liquid components, for example, organic solvents, etc. that may be optionally included as described below, in the photocurable coating composition.

The photopolymerizable compound may further include fluorine-based (meth)acrylate-based monomers or oligomers, in addition to the above-explained monomers or oligomers. When the photopolymerizable compound further includes the fluorine-based (meth)acrylate-based monomers or oligomers, the weight ratio of the fluorine-based (meth)acrylate-based monomers or oligomers to the monomer or oligomers including (meth)acrylate or vinyl groups may be 0.1% to 10%.

Examples of the fluorine-based (meth)acrylate-based monomers or oligomers may include one or more compounds selected from the group consisting of the Chemical Formulae 1 to 5.

[Chemical Formula 1]

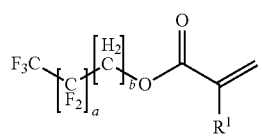

In Chemical Formula 1, $R^1$ is a hydrogen group or a C1-6 alkyl group, a is an integer of 0 to 7, and b is an integer of 1 to 3.

[Chemical Formula 2]

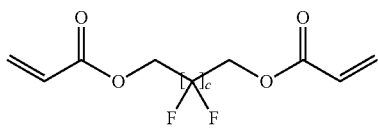

In Chemical Formula 2, c is an integer of 1 to 10.

[Chemical Formula 3]

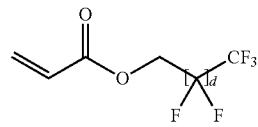

In Chemical Formula 3, d is an integer of 1 to 11.

[Chemical Formula 4]

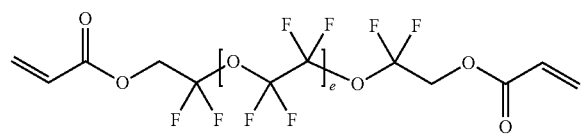

In Chemical Formula 4, e is an integer of 1 to 5.

[Chemical Formula 5]

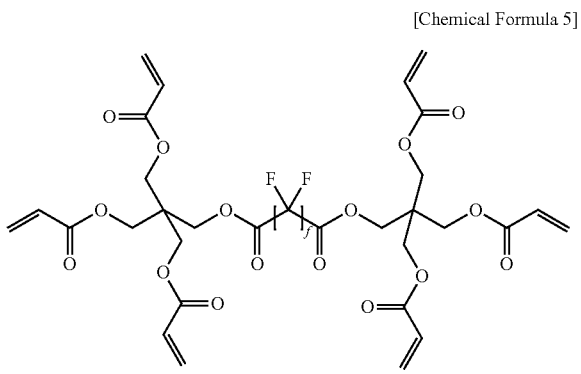

In Chemical Formula 5, f is an integer of 4 to 10.

Meanwhile, in the low refractive layer, a part derived from the fluorine-containing compound including a photoreactive functional group may be included.

In the fluorine-containing compound including a photoreactive functional group, one or more photoreactive functional groups may be included or substituted, and the photoreactive functional group means a functional group capable of participating in a polymerization reaction by the irradiation of light, for example, irradiation of visible light or UV. The photoreactive functional group may include various functional groups known to be capable of participating in a polymerization reaction by the irradiation of light, and specific examples thereof may include a (meth)acrylate group, an epoxide group, a vinyl group, or a thiol group.

Each fluorine-containing compound including a photoreactive functional group may respectively have a weight average molecular weight (in terms of polystyrene measured by GPC) of 2000 to 200,000, preferably 5000 to 100,000.

If the weight average molecular weight of the fluorine-containing compound including photoreactive functional groups is too small, the fluorine-containing compound may not be uniformly and effectively arranged on the surface of the photocurable coating composition and may be positioned inside of the finally prepared low refractive layer, and thus the anti-fouling property of the low refractive layer may be deteriorated and the crosslinking density of the low refractive layer may be lowered, thus deteriorating mechanical properties such as total strength, scratch resistance, etc.

Further, if the weight average molecular weight of the fluorine-containing compounds including photoreactive functional groups is too high, compatibility with other components in the photocurable coating composition may be lowered, and thus haze of the finally prepared low refractive layer may increase or light transmittance may decrease, and the strength of the low refractive layer may also be deteriorated.

Specifically, the fluorine-containing compound including a photoreactive functional group may include one or more selected from the group consisting of: i) aliphatic compounds or alicyclic compounds substituted by one or more photoreactive functional groups, in which at least one carbon is substituted by one or more fluorine atoms; ii) heteroaliphatic compounds or heteroalicyclic compounds substituted by one or more photoreactive functional groups, in which at least one hydrogen is substituted by fluorine, and at least one carbon is substituted by silicon; iii) a polydialkyl siloxane-based polymer (for example, a polydimethyl siloxane-based polymer) substituted by one or more photoreactive functional groups, in which at least one silicon atom is substituted by one or more fluorine atoms; iv) polyether compounds substituted by one or more photoreactive functional groups, in which at least one hydrogen is substituted by fluorine, and mixtures or copolymers of two or more of i) to iv).

The photocurable coating composition may include, based on 100 parts by weight of the photopolymerizable compound, 20 to 300 parts by weight of the fluorine-containing compound including a photoreactive functional group.

If the fluorine-containing compound including a photoreactive functional group is excessively added compared to the photopolymerizable compound, the coatability of the photocurable coating composition may be deteriorated or the low refractive layer obtained from the photocurable coating composition may not have sufficient durability or scratch resistance. Further, if the content of the fluorine-containing compound including a photoreactive functional group is too small compared to the photopolymerizable compound, the low refractive layer obtained from the photocurable coating composition may not have sufficient mechanical properties such as anti-fouling property, scratch resistance, etc.

The fluorine-containing compound including a photoreactive functional group may further include silicon or a silicon-containing compound. That is, the fluorine-containing compound including a photoreactive functional group may optionally contain silicon or a silicon-containing compound inside, and specifically, the content of silicon in the fluorine-containing compound including a photoreactive functional group may be 0.1 wt % to 20 wt %.

The silicon included in the fluorine-containing compound including a photoreactive functional group may increase compatibility with other components included in the photocurable coating composition, and thus may prevent the generation of haze in the finally prepared low refractive layer, thereby increasing transparency. Meanwhile, if the content of silicon in the fluorine-containing compound including a photoreactive functional group becomes too high, compatibility of the fluorine-containing compound with other components included in the photocurable coating composition may be rather deteriorated, and thus the finally prepared low refractive layer or anti-reflective film may not have sufficient light transmittance or anti-reflective performance and the anti-fouling property of the surface may also be deteriorated.

The low refractive layer may include, based on 100 parts by weight of the (co)polymer of photopolymerizable compounds, 10 to 400 parts by weight of the hollow inorganic nanoparticles and 10 to 400 parts by weight of the solid inorganic nanoparticles.

If the content of the hollow inorganic nanoparticles and solid inorganic nanoparticles in the low refractive layer becomes excessive, in the preparation process of the low refractive layer, phase separation between the hollow inorganic nanoparticles and the solid inorganic nanoparticles may not sufficiently occur and they may exist mixedly, and thus reflectance may increase, and surface unevenness may be excessively generated to deteriorate the anti-fouling property. If the content of the hollow inorganic nanoparticles and solid inorganic nanoparticles in the low refractive layer is too small, it may be difficult for the majority of the solid inorganic nanoparticles to be positioned near the interface between the hard coating layer and the low refractive layer, and the reflectance of the low refractive layer may significantly increase.

The low refractive layer may have a thickness of 1 nm to 300 nm, or 50 nm to 200 nm.

Meanwhile, as the hard coating layer, commonly known hard coating layers may be used without specific limitations.

One example of the hard coating layer may include a hard coating layer including a binder resin including a photocurable resin, and organic or inorganic fine particles dispersed in the binder resin.

The photocurable resin included in the hard coating layer may be a polymer of photocurable compounds capable of inducing a polymerization reaction if light such as UV, etc. is irradiated, as is commonly known in the art. Specifically, the photocurable resin may include one or more selected from the group consisting of: reactive acrylate oligomers such as a urethane acrylate oligomer, an epoxide acrylate oligomer, a polyester acrylate, and a polyether acrylate; and multifunctional acrylate monomers such as dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol acrylate, propoxylated glycerol triacrylate, tripropylene glycol diacrylate, and ethylene glycol diacrylate.

Although the particle diameter of the organic or inorganic fine particles is not specifically limited, for example, the organic fine particles may have a particle diameter of 1 μm to 10 μm, and the inorganic fine particles may have a particle diameter of 1 nm to 500 nm, or 1 nm to 300 nm. The particle diameter of the organic or inorganic fine particles may be defined as a volume average particle diameter.

Further, although specific examples of the organic or inorganic fine particles included in the hard coating layer are not particularly limited, for example, the organic or inorganic fine particles may be organic fine particles selected from the group consisting of acryl-based resin particles, styrene-based resin particles, epoxide resin particles, and nylon resin particles, or inorganic fine particles selected from the group consisting of silicon oxide, titanium dioxide, indium oxide, tin oxide, zirconium oxide, and zinc oxide.

The binder resin of the hard coating layer may further include a high molecular weight (co)polymer with a weight average molecular weight of 10,000 or more.

The high molecular weight (co)polymer may be one or more selected from the group consisting of a cellulose-based polymer, an acryl-based polymer, a styrene-based polymer, an epoxide-based polymer, a nylon-based polymer, a urethane-based polymer, and a polyolefin-based polymer.

Another example of the hard coating layer may include a hard coating layer including a binder resin of a photocurable resin, and an antistatic agent dispersed in the binder resin.

The photocurable resin included in the hard coating layer may be a polymer of photocurable compounds capable of inducing a polymerization reaction by the irradiation of light such as UV, etc., that is commonly known in the art. However, preferably, the photocurable compound may be multifunctional (meth)acrylate-based monomers or oligomers, wherein it is advantageous in terms of securing of the properties of the hard coating layer for the number of (meth)acrylate-based functional groups to be 2 to 10, preferably 2 to 8, and more preferably 2 to 7. More preferably, the photocurable compound may be one or more selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, thrylene diisocyanate, xylene diisocyanate, hexamethylene diisocyanate, trimethylol propane tri(meth)acrylate, and trimethylol propane polyethoxy tri(meth)acrylate.

The antistatic agent may be: a quaternary ammonium salt compound; pyridinium salt; a cationic compound having 1 to 3 amino groups; an anionic compound such as a sulfonic acid base, a sulfuric ester base, a phosphoric ester base, a phosphonic acid base, etc.; an amphoteric compound such as an amino acid-based or amino sulfuric ester-based compound, etc.; a non-ionic compound such as an imino alcohol-based compound, a glycerin-based compound, a polyethylene glycol-based compound, etc.; an organometal compound such as a metal alkoxide compound containing tin or titanium, etc.; a metal chelate compound such as an acetylacetonate salt of the organometal compound, etc.; reactants or polymerized products of two or more kinds of these compounds; or mixtures of two or more kinds of these compounds. Here, the quaternary ammonium salt compound may be a compound having one or more quaternary ammonium salt groups in the molecule, and a low molecular type or a high molecular type may be used without limitations.

As the antistatic agent, a conductive polymer and metal oxide fine particles may also be used. The conductive polymer may include an aromatic conjugated poly(paraphenylene), a heterocyclic conjugated polypyrrole, a polythiophene, an aliphatic conjugated polyacetylene, a heteroatom-containing conjugated polyaniline, a mixed conjugated poly(phenylene vinylene), a multi-chain type of conjugated compound which is a conjugated compound having multiple conjugated chains in the molecule, a conductive complex in which a conjugated polymer chain is grafted on or block copolymerized with a saturated polymer, etc. The metal oxide fine particles may include zinc oxide, antimony oxide, tin oxide, cerium oxide, indium tin oxide, indium oxide, aluminum oxide, antimony-doped tin oxide, aluminum-doped zinc oxide, etc.

The hard coating layer including a binder resin of a photocurable resin, and an antistatic agent dispersed in the binder resin, may further include one or more compounds selected from the group consisting of an alkoxy silane-based oligomer and a metal alkoxide-based oligomer.

Although the alkoxy silane-based compound may be one commonly used in the art, preferably, it may include one or more compounds selected form the group consisting of tetramethoxysilane, tetraethoxysilane, tetraisopropoxysilane, methyltrimethoxysilane, methyltriethoxysilane, methacryloxypropyltrimethoxysilane, glycidoxy propyl trimethoxy silane, and glycidoxypropyltriethoxysilane.

The metal alkoxide-based oligomer may be prepared by a sol-gel reaction of a composition including a metal alkoxide-based compound and water. The sol-gel reaction may be conducted by a similar method to the above-explained preparation method of the alkoxy silane-based oligomer.

However, since the metal alkoxide-based compound may rapidly react with water, the sol-gel reaction may be conducted by diluting the metal alkoxide-based compound in an organic solvent, and then, slowly dripping water thereto. At this time, considering the reaction efficiency, it is preferable that the mole ratio of the metal alkoxide-based compound to water (based on metal ions) is controlled within a range of 3 to 170.

Here, the metal alkoxide-based compound may be one or more compounds selected from the group consisting of titanium tetra-isopropoxide, zirconium isopropoxide, and aluminum isopropoxide.

The hard coating layer may have a thickness of 0.1 μm to 100 μm.

The anti-reflective film may further include a substrate bonded to the other side of the hard coating layer. Specific kinds or thicknesses of the substrate are not particularly limited, and substrates known to be used in the preparation of low refractive layers or anti-reflective films may be used without specific limitations.

According to another embodiment of the present invention, a method for preparing an anti-reflective film is provided, including the steps of: applying a resin composition for forming a low refractive layer including a photopolymerizable compound or a (co)polymer thereof, a fluorine-containing compound including a photoreactive functional group, a photoinitiator and porous inorganic nanoparticles with a diameter of 5 nm to 70 nm including micropores with a diameter of 0.5 nm to 10 nm, on a hard coating layer, and drying it; and photocuring the dried product of the resin composition.

Through the preparation method of an anti-reflective film, the anti-reflective film of the above-explained embodiment can be provided.

As explained above, when porous inorganic nanoparticles including micropores with a diameter of 0.5 nm to 10 nm are distributed in a low refractive layer included in an anti-reflective film, low reflectance of a level that could not be realized in the previously known anti-reflective films can be realized, and the anti-reflective film has high light transmittance and can simultaneously realize high scratch resistance and anti-pollution properties.

More specifically, the anti-reflective film provided by the above preparation method includes: a hard coating layer; and a low refractive layer that is formed on one side of the hard coating layer, and includes a binder resin and porous inorganic nanoparticles with a diameter of 5 nm to 70 nm including micropores with a diameter of 0.5 nm to 10 nm dispersed in the binder resin.

The low refractive layer may be formed by applying a resin composition for forming a low refractive layer including a photopolymerizable compound or a (co)polymer thereof, a fluorine-containing compound including a photoreactive functional group, a photoinitiator, hollow inorganic nanoparticles, and solid inorganic nanoparticles on a hard coating layer, and drying it at a temperature of 35° C. to 100° C., or 40° C. to 80° C.

If the temperature for drying the resin composition for forming a low refractive layer applied on the hard coating layer is less than 35° C., the formed low refractive layer may have significantly deteriorated anti-fouling property. Further, if the temperature for drying the resin composition for forming a low refractive layer applied on the hard coating layer is greater than 100° C., in the preparation process of the low refractive layer, the substrate may be eroded, thus deteriorating scratch resistance and anti-pollution properties of the low refractive layer and generating haze in the finally prepared anti-reflective film.

The step of drying the resin composition for forming a low refractive layer applied on the hard coating layer at a temperature of 35° C. to 100° C. may be conducted for 10 seconds to 5 minutes, or 30 seconds to 4 minutes.

If the drying time is too short, dispersion of the porous inorganic nanoparticles including micropores with a diameter of 0.5 nm to 10 nm may not sufficiently occur. To the contrary, if the drying time is too long, the formed low refractive layer may erode the hard coating layer.

The low refractive layer may be prepared from a photocurable coating composition including a photopolymerizable compound or a (co)polymer thereof, a fluorine-containing compound including a photoreactive functional group, hollow inorganic nanoparticles, solid inorganic nanoparticles, and a photoinitiator.

The low refractive layer may be obtained by applying the photocurable coating composition on a predetermined substrate and photocuring the applied product. Specific kinds or thicknesses of the substrate are not significantly limited, and any substrates known to be used for the preparation of low refractive layers or anti-reflective films may be used without specific limitations.

For the application of the photocurable coating composition, commonly used methods, and apparatuses may be used without specific limitations, and for example, bar coating such as Meyer bar coating, etc., gravure coating, 2 roll reverse coating, vacuum slot die coating, 2 roll coating, etc. may be used.

The low refractive layer may have a thickness of 1 nm to 300 nm, or 50 nm to 200 nm. Thus, the thickness of the photocurable coating composition applied on the predetermined substrate may be about 1 nm to 300 nm, or 50 nm to 200 nm.

In the step of photocuring the photocurable coating composition, UV or visible rays of a 200~400 nm wavelength may be irradiated, and the exposure amount may be 100 mJ/cm$^2$ to 4000 mJ/cm$^2$. The exposure time is not specifically limited, and may be appropriately changed according to the exposure apparatus used, the wavelength of irradiated light rays, or the exposure amount.

In the step of photocuring the photocurable coating composition, nitrogen purging, etc. may be conducted so as to apply a nitrogen atmosphere condition.

The details of the porous inorganic nanoparticles including micropores with a diameter of 0.5 nm to 10 nm and a fluorine-containing compound including a photoreactive functional group are as explained above with regard to the anti-reflective film of one embodiment.

The resin composition for forming a low refractive layer may further include one or more kinds of inorganic nanoparticles selected from the group consisting of hollow inorganic nanoparticles and solid inorganic nanoparticles. The details of the hollow inorganic nanoparticles and solid inorganic nanoparticles are as explained above with regard to the anti-reflective film of one embodiment.

The hollow inorganic nanoparticles and the solid inorganic nanoparticles may be respectively included in the composition as a colloidal phase dispersed in a predetermined dispersion medium. Each colloidal phase including the hollow inorganic nanoparticles and the solid inorganic nanoparticles may include an organic solvent as a dispersion medium.

Each content of the hollow inorganic nanoparticles and the solid inorganic nanoparticles in a colloidal phase may be determined considering each content range of the hollow inorganic nanoparticles and the solid inorganic nanoparticles in the photocurable coating composition or the viscosity of the photocurable coating composition, etc., and for example, each solid content of the hollow inorganic nanoparticles and the solid inorganic nanoparticles in the colloidal phase may be 5 wt % to 60 wt %.

Here, as the organic solvent in the dispersion medium, alcohols such as methanol, isopropyl alcohol, ethylene glycol, butanol, etc.; ketones such as methyl ethyl ketone, methyl isobutyl ketone, etc.; aromatic hydrocarbons such as toluene, xylene, etc.; amides such as dimethylformamide, dimethylacetamide, N-methylpyrrolidone, etc.; esters such as ethyl acetate, butyl acetate, gamma butyrolactone, etc.; ethers such as tetrahydrofuran, 1,4-dioxane, etc.; or mixtures thereof may be included.

As the photopolymerization initiator, any compounds known to be usable in a photocurable resin composition may be used without significant limitations, and specifically, a benzophenone-based compound, an acetophenone-based compound, a biimidazole-based compound, a triazine-based compound, an oxime-based compound, or mixtures of two or more kinds thereof may be used.

The photopolymerization initiator may be used in the content of 1 to 100 parts by weight, based on 100 parts by weigh of the photopolymerizable compound. If the content of the photopolymerization initiator is too small, materials that are not cured in the step of photocuring of the photocurable coating composition and remain may be generated. If the content of the photopolymerization initiator is too large, unreacted initiators may remain as impurities or a cross-linking degree may be lowered, and thus the mechanical properties of the prepared film may be deteriorated or reflectance may significantly increase.

The photocurable coating composition may further include an organic solvent.

Non-limiting examples of the organic solvent may include, for example, ketones, alcohols, acetates, ethers, and mixtures of two or more kinds thereof.

Specific examples of the organic solvent may include ketones such as methyl ethyl ketone, methyl isobutyl ketone, acetylacetone, isobutyl ketone, etc.; alcohols such as methanol, ethanol, diacetone alcohol, n-propanol, i-propanol, n-butanol, i-butanol, t-butanol, etc.; acetates such as ethyl acetate, i-propyl acetate, polyethylene glycol monomethylether acetate, etc.; ethers such as tetrahydrofuran or propylene glycol monomethylether, etc.; and mixtures of two or more kinds thereof.

The organic solvent may be added when mixing the components included in the photocurable coating composition, or each component may be added while being dispersed in or mixed in the organic solvent. If the content of the organic solvent in the photocurable coating composition is too small, flowability of the photocurable coating composition may be deteriorated, and thus defects such as stripes, etc. may be generated in the finally prepared film. Further, if the organic solvent is excessively added, solid content may decrease, and thus coating and film formation may not be sufficiently achieved, thus deteriorating the physical properties or surface property of the film, and generating defects in the process of drying and curing. Thus, the photocurable coating composition may include an organic solvent such that the total solid concentration of the included components may become 1 to 50 wt %, or 2 to 20 wt %.

As the hard coating layer, a material known to be usable in an anti-reflective film may be used without specific limitations.

As explained above, one example of the hard coating layer may include a hard coating layer including a binder resin including a photocurable resin, and organic or inorganic fine particles dispersed in the binder resin.

Thus, the preparation method of the anti-reflective film may further include the steps of applying a polymer resin composition for forming a hard coating layer including a photopolymerizable compound or a (co)polymer thereof, a photoinitiator, and organic or inorganic fine particles on a substrate and photocuring it, through which the hard coating layer may be formed.

Another example of the hard coating layer may include a hard coating layer including binder resin of photocurable resin, and an antistatic agent dispersed in the binder resin.

Thus, the preparation method of the anti-reflective film may further include the steps of applying a polymer resin composition for forming a hard coating layer including a photopolymerizable compound or a (co)polymer thereof, a photoinitiator, and an antistatic agent on a substrate, and photocuring it, through which the hard coating layer may be formed.

The components used for the formation of the hard coating layer are as explained above with regard to the anti-reflective film of the embodiment.

The polymer resin composition for forming a hard coating layer may further include one or more compounds selected from the group consisting of alkoxy silane-based oligomers and metal alkoxide-based oligomers.

For the application of the polymer resin composition for forming a hard coating layer, commonly used methods and apparatuses may be used without specific limitations, and for example, bar coating such as Meyer bar coating, etc., gravure coating, 2 roll reverse coating, vacuum slot die coating, 2 roll coating, etc. may be used.

In the step of photocuring the polymer resin composition for forming a hard coating layer, UV or visible rays of 200~400 nm wavelength may be irradiated, wherein the exposure amount may be preferably 100 to 4000 mJ/cm$^2$. The exposure time is not specifically limited, and may be appropriately changed according to the exposure apparatus used, the wavelength of irradiated light rays, or the exposure amount. In the step of photocuring the polymer resin composition for forming a hard coating layer, nitrogen purging, etc. may be conducted so as to apply a nitrogen atmosphere condition.

Advantageous Effects

According to the present invention, an anti-reflective film that has low reflectance and high light transmittance, that can simultaneously realize high scratch resistance and antipollution properties, and that can increase the screen sharpness of a display device, and a method for preparing the anti-reflective film, are provided.

DETAILED DESCRIPTION OF THE INVENTION

The present invention will be explained in detail in the following examples. However, these examples are presented only as the illustrations of the present invention, and the scope of the present invention is not limited thereby.

PREPARATION EXAMPLE

Preparation Example: Preparation of a Hard Coating Layer

A salt-type antistatic hard coating liquid manufactured by KYOEISHA Company (solid content 50 wt %, product name: LJD-1000) was coated on a triacetyl cellulose film with a #10 Mayer bar and dried at 90° C. for 1 minute, and then irradiated by UV at 150 mJ/cm$^2$ to prepare a hard coating layer with a thickness of about 5 μm to 6 μm.

EXAMPLES 1 TO 5: PREPARATION OF AN ANTI-REFLECTIVE FILM

Example 1

(1) Preparation of a Photocurable Coating Composition for Forming a Low Refractive Layer A solid content including 25.5 wt % of pentaerythritol triacrylate (PETA), 5 wt % of a fluorine-containing compound (RS-537, DIC Corporation), 4.5 wt % of an initiator (Irgacure 127, Ciba Company), and 65 wt % of porous inorganic nanoparticles (micropore size of about 4.1 nm by BJH analysis, BET surface area of about 917.5 m$^2$/g, particle diameter of about 20 nm, surface treated with 3-methacryloyloxypropyl dimethoxysilane) was diluted in MIBK (methyl isobutyl ketone) such that the solid concentration became 3.2 wt %.

(2) Preparation of a Low Refractive Layer and an Anti-Reflective Film

On the hard coating layer of the preparation example, the above-obtained photocurable coating composition was coated to a thickness of about 110 nm to 120 nm with a #4 Mayer bar, and dried and cured at a temperature of 60° C. for 1 minute. During the curing, UV at 252 mJ/cm$^2$ was irradiated to the dried coating under nitrogen purging.

Example 2

A solid content including 27 wt % of pentaerythritol triacrylate (PETA), 5 wt % of a fluorine-containing compound (RS-537, DIC Corporation), 4.5 wt % of an initiator (Irgacure 127, Ciba Company), and 65 wt % of porous inorganic nanoparticles (micropore size of about 4.5 nm by BJH analysis, BET surface area of about 941.7 m$^2$/g, particle diameter of about 23 nm, surface treated with 3-methacryloyloxypropyl dimethoxysilane) was diluted in MIBK (methyl isobutyl ketone) such that the solid concentration became 3.2 wt %.

A low refractive layer and an anti-reflective film were prepared by the same method as Example 1.

Example 3

A solid content including 20 wt % of pentaerythritol triacrylate (PETA), 5 wt % of a fluorine-containing compound (RS-537, DIC Corporation), 4.5 wt % of an initiator (Irgacure 127, Ciba Company), and 70.5 wt % of porous inorganic nanoparticles (micropore size of about 3.9 nm by BJH analysis, BET surface area of about 933.1 m$^2$/g, particle diameter of about 21 nm, surface treated with 3-methacryloyloxypropyl dimethoxysilane) was diluted in MIBK (methyl isobutyl ketone) such that the solid concentration became 3.2 wt %.

A low refractive layer and an anti-reflective film were prepared by the same method as Example 1.

Example 4

A solid content including 30 wt % of pentaerythritol triacrylate (PETA), 5 wt % of a fluorine-containing compound (RS-537, DIC Corporation), 4.5 wt % of an initiator (Irgacure 127, Ciba Company), and 60.5 wt % of porous inorganic nanoparticles (micropore size of about 4.2 nm by BJH analysis, BET surface area of about 923.3 m$^2$/g, particle diameter of about 22 nm, surface treated with 3-methacryloyloxypropyl dimethoxysilane) was diluted in MIBK (methyl isobutyl ketone) such that the solid concentration became 3.2 wt %.

A low refractive layer and an anti-reflective film were prepared by the same method as Example 1.

COMPARATIVE EXAMPLES: PREPARATION OF ANTI-REFLECTIVE FILMS

Comparative Example 1

A photocurable coating composition for forming a low refractive layer was prepared by the same method as Example 1, except that 65 wt % of hollow silica nanoparticles (diameter of about 50 to 60 nm, density of 1.96 g/cm$^3$, manufactured by JSC Catalyst and Chemicals) were used instead of 65 wt % of porous inorganic nanoparticles used in Example 1, and an anti-reflective film was prepared by the same method as Example 1.

Comparative Example 2

A photocurable coating composition for forming a low refractive layer was prepared by the same method as Example 1, except that 65 wt % of hollow silica nanoparticles (diameter: about 60 to 70 nm, manufactured by JSC Catalyst and Chemicals) were used instead of 65 wt % of porous inorganic nanoparticles used in Example 1, and an anti-reflective film was prepared by the same method as Example 1.

Comparative Example 3

A photocurable coating composition for forming a low refractive layer was prepared by the same method as Example 1, except that 65 wt % of porous inorganic nanoparticles (micropore size of about 4.8 nm by BJH analysis, BET surface area of about 945.5 m$^2$/g, particle diameter of about 85 nm) were used instead of 65 wt % of the porous inorganic nanoparticles used in Example 1, and an anti-reflective film was prepared by the same method as Example 1.

Experimental Example: Measurement of the Properties of Anti-Reflective Films For the anti-reflective films obtained in the examples and comparative examples, the following experiments were conducted.

1. Measurement of Mean Reflectance of an Anti-Reflective Film

The mean reflectances of the anti-reflective films of the examples and comparative examples at a visible light region (380 to 780 nm) were measured using Solidspec 3700 equipment (SHIMADZU).

2. Measurement of Anti-Fouling Property

On the surface of the anti-reflective films obtained in the examples and comparative examples, straight lines with the length of 5 cm were drawn with a black oil-based pen, and rubbed with a clean wiper, and the number of rubs at which the lines were erased was confirmed to measure the anti-fouling property.

<Measurement Standard>

◯: Erased at 10 or fewer rubs

Δ: Erased at 11 to 20 rubs

X: Erased at more than 20 rubs

3. Measurement of Scratch Resistance

While steel wool was loaded and allowed to go back and forth 10 times at 27 rpm, the surfaces of the anti-reflective films obtained in the examples and comparative examples were rubbed. The maximum load under which one or fewer scratches of 1 cm or less was observed with the unaided eye was measured.

4. Measurement of Haze

Haze of the anti-reflective films obtained in the examples and comparative examples was measured using HM-150 equipment through a light source according to a JIS K7105 standard.

TABLE 1

|  | Mean reflectance (%) | Scratch resistance (g) | Anti-fouling property | Haze (%) |
|---|---|---|---|---|
| Example 1 | 0.27 | 300 | ○ | 0.2 |
| Example 2 | 0.28 | 300 | ○ | 0.2 |
| Example 3 | 0.21 | 300 | ○ | 0.2 |
| Example 4 | 0.29 | 300 | ○ | 0.2 |
| Comparative Example 1 | 0.60 | 50 | X | 0.2 |
| Comparative Example 2 | 0.50 | 50 | X | 0.2 |
| Comparative Example 3 | 0.4 | 50 | X | 0.6 |

As shown in Table 1, it was confirmed that the anti-reflective films of Examples 1 to 4 exhibit significantly lowered reflectance, specifically low reflectance of 0.30% or less, compared to the reflectance level realized by the previously known anti-reflective film. It was also confirmed that the anti-reflective films of Examples 1 to 4 can simultaneously realize high scratch resistance and anti-pollution properties as well as the above-explained low reflectance.

To the contrary, it was confirmed that the anti-reflective films of Comparative Examples 1 to 3 exhibit relatively high mean reflectance while exhibiting low scratch resistance and anti-pollution properties, and the anti-reflective film of Comparative Example 3 exhibits a relatively high haze value.

What is claims:

1. An anti-reflective film comprising:
   a hard coating layer; and
   a low refractive layer that is formed on one side of the hard coating layer, and comprising porous inorganic nanoparticles with a diameter of 5 nm to 70 nm comprising micropores with a diameter of 0.5 nm to 4.5 nm, and a binder resin,
   wherein the anti-reflective film exhibits mean reflectance of 0.40% or less in the visible light wavelength region of 380 nm to 780 nm, and
   wherein the porous inorganic nanoparticles have a BET surface area of 917.5 m2/g to 2000 m$^2$/g and the diameter of the micropores are measured based on a Barret-Joyner-Halenda (BJH) analysis.

2. The anti-reflective film according to claim 1, wherein the porous inorganic nanoparticles have a diameter of 10 nm to 60 nm.

3. The anti-reflective film according to claim 1, wherein a content of the porous inorganic nanoparticles in the low refractive layer is 15 wt % to 80 wt %.

4. The anti-reflective film according to claim 1, wherein the low refractive layer further comprises one or more kinds of inorganic nanoparticles selected from the group consisting of hollow inorganic nanoparticles and solid inorganic nanoparticles.

5. The anti-reflective film according to claim 1, wherein the binder resin included in the low refractive layer comprises a (co)polymer of photopolymerizable compounds and a cross-linked (co)polymer of fluorine-containing compounds comprising photoreactive functional groups.

6. The anti-reflective film according to claim 1, wherein the photopolymerizable compound comprises monomers or oligomers comprising (meth)acrylate or vinyl groups.

7. The anti-reflective film according to claim 1, wherein the fluorine-containing compounds comprising photoreactive functional groups respectively have a weight average molecular weight of 2000 to 200,000.

8. The anti-reflective film according to claim 1, wherein the binder resin comprises, based on 100 parts by weight of the (co)polymer of photopolymerizable compounds, 20 to 300 parts by weight of the fluorine-containing compounds comprising photoreactive functional groups.

9. The anti-reflective film according to claim 1, wherein the photoreactive functional group included in the fluorine-containing compound is one or more selected from the group consisting of a (meth)acrylate group, an epoxide group, a vinyl group, and a thiol group.

10. The anti-reflective film according to claim 5, wherein the fluorine-containing compounds comprising photoreactive functional groups include one or more selected from the group consisting of: i) aliphatic compounds or alicyclic compounds substituted by one or more photoreactive functional groups, in which at least one carbon is substituted by one or more fluorine atoms; ii) heteroaliphatic compounds or heteroalicyclic compounds substituted by one or more photoreactive functional groups, in which at least one hydrogen is substituted by fluorine, and at least one carbon is substituted by silicon; iii) polydialkyl siloxane-based polymer substituted by one or more photoreactive functional groups, in which at least one silicon atom is substituted by one or more fluorine atoms; and iv) polyether compounds substituted by one or more photoreactive functional groups, in which at least one hydrogen is substituted by fluorine.

11. The anti-reflective film according to claim 1, wherein the hard coating layer comprises a binder resin comprising a photocurable resin, and an antistatic agent dispersed in the binder resin.

12. The anti-reflective film according to claim 11, wherein the hard coating layer further comprises one or more compounds selected from the group consisting of an alkoxy silane-based oligomer and a metal alkoxide-based oligomer.

13. The anti-reflective film according to claim 1, wherein a photoreactive functional group is introduced or a compound comprising a photoreactive functional group is bonded on the surface of the porous inorganic nanoparticles.

14. A method for preparing an anti-reflective film according to claim 1 comprising the steps of:
    applying a resin composition for forming a low refractive layer comprising a photopolymerizable compound or a (co)polymer thereof, a fluorine-containing compound comprising a photoreactive functional group, a photoinitiator and porous inorganic nanoparticles with a diameter of 5 nm to 70 nm comprising micropores with a diameter of 0.5 nm to 10 nm, on a hard coating layer, and drying it; and photocuring the dried product of the resin composition.

15. The method for preparing an anti-reflective film according to claim 14,
wherein the resin composition for forming a low refractive layer applied on the hard coating layer is dried at a temperature of 35° C. to 100° C.

16. The method for preparing an anti-reflective film according to claim 15,
wherein the step of drying the resin composition for forming a low refractive layer applied on the hard coating layer at a temperature of 35° C. to 100° C. is conducted for 10 seconds to 5 minutes.

17. The method for preparing an anti-reflective film according to claim 14, further comprising the step of:
applying a polymer resin composition for forming a hard coating layer comprising a photopolymerizable compound or a (co)polymer thereof, a photoinitiator, and an antistatic agent on a substrate, and photocuring it; or
applying a polymer resin composition for forming a hard coating layer comprising a photopolymerizable compound or a (co)polymer thereof, a photoinitiator, and organic or inorganic fine particles on a substrate, and photocuring it.

* * * * *